(12) United States Patent
Hai (10) Patent No.: US 12,007,645 B2
(45) Date of Patent: Jun. 11, 2024

(54) LIGHT SOURCE MODULE, LIQUID CRYSTAL DISPLAY DEVICE, AND A DISPLAY APPARATUS

(71) Applicant: TCL CHINA STAR OPTOELECTRONICS TECHNOLOGY CO., LTD., Guangdong (CN)

(72) Inventor: Bo Hai, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/597,943

(22) PCT Filed: Jan. 14, 2022

(86) PCT No.: PCT/CN2022/071986
§ 371 (c)(1),
(2) Date: Jul. 13, 2023

(87) PCT Pub. No.: WO2023/130495
PCT Pub. Date: Jul. 13, 2023

(65) Prior Publication Data
US 2024/0036390 A1    Feb. 1, 2024

(30) Foreign Application Priority Data
Jan. 10, 2022 (CN) .......... 202210020931.2

(51) Int. Cl.
*G02F 1/13357* (2006.01)
*F21V 8/00* (2006.01)

(52) U.S. Cl.
CPC ..... *G02F 1/133603* (2013.01); *G02B 6/0055* (2013.01); *G02B 6/0073* (2013.01); *G02F 1/133605* (2013.01)

(58) Field of Classification Search
CPC ......... G02F 1/133603; G02F 1/133605; G02B 6/0055; G02B 6/0073; G02B 6/0015; G02B 6/0016; G02B 6/0018; G02B 6/0013
See application file for complete search history.

(56) References Cited

U.S. PATENT DOCUMENTS 5,709,447 A * 1/1998 Murakami .......... G02B 6/0061
362/621
7,969,531 B1 * 6/2011 Li ...................... G02B 6/0036
349/200
(Continued)

FOREIGN PATENT DOCUMENTS

CN    1437059 A    8/2003
CN    1971359 A    5/2007
(Continued)

OTHER PUBLICATIONS

International Search Report in International application No. PCT/CN2022/071986, mailed on Jun. 1, 2022.
(Continued)

*Primary Examiner* — Bao Q Truong
(74) *Attorney, Agent, or Firm* — PV IP PC; Zhigang Ma; Wei Te Chung (57) ABSTRACT

A light source module, a liquid crystal display device, and a display apparatus are provided. The light source module disposes a plurality of micro structures disposed at intervals on a light guide surface of a light guide plate and disposes a sum of areas of the micro structures on an unit area on the light guide surface gradually increasing from a light incident
(Continued)

side to a light exiting side, which can improve uniformity of light exiting brightness of each region of the light guide plate.

18 Claims, 4 Drawing Sheets

(56) References Cited

U.S. PATENT DOCUMENTS

| | | | | |
|---|---|---|---|---|
| 8,496,368 | B2* | 7/2013 | Tiao | G02B 6/0043 |
| | | | | 362/617 |
| 11,385,395 | B1* | 7/2022 | Qiu | G02B 6/005 |
| 2004/0179154 | A1 | 9/2004 | Hong | |
| 2006/0001036 | A1* | 1/2006 | Jacob | G02F 1/133603 |
| | | | | 257/98 |
| 2011/0096567 | A1 | 4/2011 | Tiao et al. | |
| 2011/0176327 | A1 | 7/2011 | Iwasaki | |
| 2015/0078033 | A1* | 3/2015 | Lee | G02B 6/0055 |
| | | | | 362/609 |
| 2015/0331173 | A1* | 11/2015 | Wang | G02B 6/0066 |
| | | | | 362/626 |
| 2016/0363811 | A1* | 12/2016 | Zhong | G02B 6/0036 |
| 2018/0011238 | A1* | 1/2018 | Xie | G02B 6/0055 |

FOREIGN PATENT DOCUMENTS

| | | |
|---|---|---|
| CN | 101169541 A | 4/2008 |
| CN | 102155687 A | 8/2011 |
| CN | 103197370 A | 7/2013 |
| CN | 103712124 A | 4/2014 |
| CN | 205246928 U | 5/2016 |
| CN | 105891934 A | 8/2016 |
| CN | 107783221 A | 3/2018 |
| CN | 108363137 A | 8/2018 |
| CN | 110515151 A | 11/2019 |
| CN | 110764324 A | 2/2020 |
| CN | 111708220 A | 9/2020 |
| CN | 113156567 A | 7/2021 |
| CN | 113419377 A | 9/2021 |
| CN | 214335425 U | 10/2021 |
| JP | 3215833 U | 4/2018 |

OTHER PUBLICATIONS

Written Opinion of the International Search Authority in International application No. PCT/CN2022/071986, mailed on Jun. 1, 2022.
Chinese Office Action issued in corresponding Chinese Patent Application No. 202210020931.2 dated Oct. 10, 2022, pp. 1-8.

* cited by examiner

LIGHT SOURCE MODULE, LIQUID CRYSTAL DISPLAY DEVICE, AND A DISPLAY APPARATUS

FIELD OF INVENTION

The present application relates to a field of display technologies, especially to a light source module, a liquid crystal display device, and a display apparatus.

BACKGROUND OF INVENTION

A liquid crystal display (LCD) device has many advantages such as thin body, power saving, no radiation, etc., is extensively applied in fields of: cell phone, personal digital assistant (PDA), digital camera, computer screen, or notebook screen.

Most of conventional liquid crystal display devices in the market are transmissive liquid crystal display devices in which a backlight source is disposed under a liquid crystal display panel, and adjusting a transmittance of the liquid crystal display panel implements display under different brightness.

SUMMARY OF INVENTION

Technical Issue

According to different applications, the liquid crystal display devices further include a reflective liquid crystal display device. Under irradiation of ambient light, the reflective liquid crystal display device can reflect the ambient light to perform display. Outdoor high ambient light has a better display effect. However, when brightness of ambient light is lowered, especially in a dark environment such as a night, the display effect is lowered accordingly. Especially, the reflective liquid crystal display device cannot work normally without the ambient light.

Technical Solution

An embodiment of the present application provides a light source module, a liquid crystal display device, and a display apparatus. The light source module can provide the reflective liquid crystal display panel with an area light source such that the reflective liquid crystal display panel can perform a better display effect in a dark environment and a condition without ambient light and improve exiting light uniformity of the reflective liquid crystal display panel.

In a first aspect, the embodiment of the present application provides a light source module, including:
  a light guide plate, including a light guide surface and a light exiting surface disposed oppositely, wherein a plurality of micro structures are disposed on a light guide surface of the light guide plate at intervals, a side of the light guide plate disposed toward the light source is defined as a light incident side, a side of the light guide plate disposed away from the light source is defined as a light exiting side, and from the light incident side to the light exiting side, a sum of areas of the micro structures disposed on a unit area of the light guide surface gradually increases; and
  a light source disposed on a side of the light guide plate.

In some embodiments, from the light incident side to the light exiting side, an area of each of the micro structures disposed on the light guide surface is the same; and from the light incident side to the light exiting side, a number of the micro structures disposed on each unit area of the light guide surface gradually increases.

In some embodiments, from the light incident side to the light exiting side, a number of the micro structures disposed on each unit area of the light guide surface is the same; and from the light incident side to the light exiting side, an area of each of the micro structures disposed on the light guide surface gradually increases.

In some embodiments, from the light incident side to the light exiting side, a number of the micro structures disposed on each unit area of the light guide surface gradually increases; and from the light incident side to the light exiting side, an area of each of the micro structures disposed on the light guide surface gradually increases.

In some embodiments, from the light incident side to the light exiting side, a number of the micro structures disposed on each unit area of the light guide surface gradually decreases; and from the light incident side to the light exiting side, an area of each of the micro structures disposed on the light guide surface gradually increases.

In some embodiments, from the light incident side to the light exiting side, a number of the micro structures disposed on each unit area of the light guide surface gradually increases; and from the light incident side to the light exiting side, an area of each of the micro structures disposed on the light guide surface gradually decreases.

In some embodiments, the light source module includes a reflector disposed on a side of the light guide plate.

In some embodiments, the reflector is disposed on each of sides of the light guide plate except for a region of the light incident side.

In some embodiments, the reflector is adhered to the light guide plate through a light transmission adhesive.

In some embodiments, the micro structures are a protrusion structures or a recess structures.

In a second aspect, the embodiment of the present application provides a liquid crystal display device, including:
  a reflective liquid crystal display panel; and
  a light source module stacked on the reflective liquid crystal display panel, wherein the light source module is the light source module as above, and the light exiting surface of the light guide plate is disposed toward a display side of the reflective liquid crystal display panel.

In some embodiments, the reflective liquid crystal display panel includes a first substrate and a second substrate disposed oppositely and a liquid crystal layer disposed between the first substrate and the second substrate, a side of the first substrate away from the liquid crystal layer is disposed toward the light guide plate, and a reflective layer is disposed in the second substrate.

In a third aspect, the embodiment of the present application provides a display apparatus, including the liquid crystal display device as above.

Advantages

The light source module provided by the embodiment of the present application, disposing a plurality of micro structures on a light guide surface of the light guide plate at intervals and disposing and setting a sum of areas of the micro structures on a unit area on the light guide surface gradually increasing from the light incident side to the light exiting side. Because a light energy of a region of the light guide plate near the light incident side is greater, the sum of the areas of the micro structures disposed on the unit area of the light guide surface is smaller, which can reduce a damaging ability to the light total reflection such that a part of light can be transmitted gradually toward the light exiting side under the effect of the total reflection. Because a light energy of a region of light guide plate near light exiting side is smaller, the sum of the areas of the micro structures disposed on the unit area of the light guide surface is greater, which can enhance the damaging ability to the light total reflection such light can be emitted out from the light guide plate as much as possible. As described above, the embodiment of the present application sets the sum of the areas of the micro structures disposed on the unit area of the light guide surface gradually increasing from the light incident side to the light exiting side, which can improve uniformity of light exiting brightness of each region of the light guide plate. The light source module can provide the reflective liquid crystal display panel with an area light source to improve the light exiting brightness of the reflective liquid crystal display panel and exiting light uniformity of each region of the display panel.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

Figure 1:
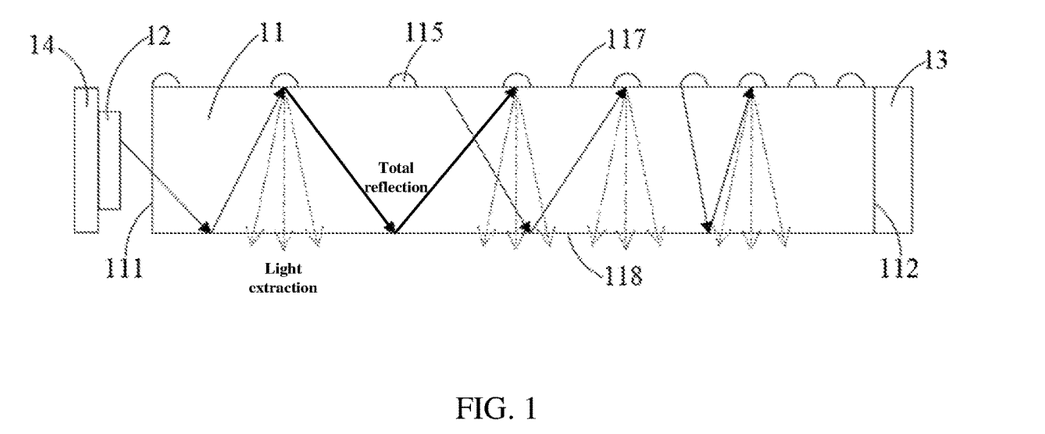
FIG. 1 is a schematic cross-sectional view of a light source module provided by the embodiment of the present application.
Figure 2:
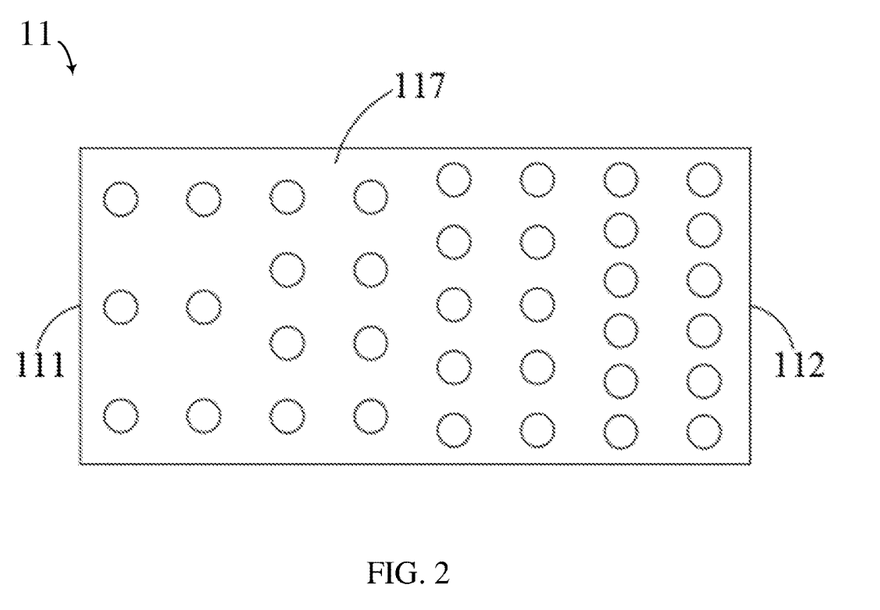
FIG. 2 is a first schematic top view of a light guide plate provided by the embodiment of the present application.

With reference to FIGS. 1 and 2, FIG. 1 is a schematic cross-sectional view of a light source module provided by the embodiment of the present application. FIG. 2 is a first schematic top view of a light guide plate provided by the embodiment of the present application. The embodiment of the present application provides a light source module 10 including a light guide plate 11 and a light source 12 dispose don a side of the light guide plate 11. The light guide plate 11 includes a light guide surface 117 and a light exiting surface 118 disposed oppositely. A plurality of micro structures 115 are disposed on the light guide surface 117 of the light guide plate 11 at intervals. A side of the light guide plate 11 disposed toward the light source 12 is defined as a light incident side 111, a side of the light guide plate 11 disposed away from the light source 12 is defined as a light exiting side 112. From the light incident side 111 to the light exiting side 112, a sum of areas of the micro structures 115 disposed on a unit area of the light guide surface 117 gradually increases.

It should be explained that the micro structures 115 on the light guide surface 117 can perform a function of damaging the light total reflection, light emitted out from the light source 12, after entering the light guide plate 11 through the light incident side 111, has total reflection on a region of the light guide surface 117 without the micro structures 115 such that the light is transmitted from the light incident side 111 to the light exiting side 112. When light in the light guide plate 11 enters the micro structures 115, diffuse reflection occurs to result in change of light transmission direction, and a part of light is transmitted out from the light exiting surface 118 of the light guide plate 11 to achieve light extraction. In FIG. 1, a light transmission path depicted with solid lines is a total reflection path of the light, and a light transmission path depicted with broken lines is a light extraction path.

For example, the micro structures 115 can be disposed on an entire surface of the light guide surface 117 of the light guide plate 11, and can disposed only on a partial region of the light guide surface 117 of the light guide plate 11.

The light source module 10 provided by the embodiment of the present application disposes a plurality of the micro structures 115 on the light guide surface 117 of the light guide plate 11 at intervals and sets the sum of the areas of the micro structures 115 on the unit area of the light guide plate 11 gradually increasing from the light incident side 111 to the light exiting side 112. Because a light energy on a region of the light guide plate 11 near the light incident side 111 is greater, the sum of the areas of the micro structures 115 disposed on each unit area on the light guide surface 117 is smaller, which can weaken a damaging ability to light total reflection such that a part of light can be gradually transmitted toward the light exiting side 112 under an effect of total reflection. Because a light energy of a region of the light guide plate 11 near the light exiting side 112 is smaller, the sum of the areas of the micro structures 115 disposed on the unit area on the light guide surface 117 is greater, which can enhance a damaging ability to the light total reflection such that light can be emitted out from the light guide plate 11 as much as possible. As described above, the embodiment of the present application disposes the sum of the areas of the micro structures 115 disposed on the unit area on the light guide surface 117 gradually increasing from the light incident side 111 to the light exiting side 112, which can improve uniformity of light exiting brightness of each region of the light guide plate 11. The light source module can provide the reflective liquid crystal display panel with a area light source to improve light exiting brightness of the reflective liquid crystal display panel and light uniformity of each region of the display panel.

It can be understood that in actual applications, a specific of the "unit area" can be determined depending on an actual condition (for example, an area of the light guide plate 11 and an area of each of the micro structures 115). For example, the unit area can be 1 cm², 2 cm², 3 cm², 4 cm², 5 cm², 6 cm², 7 cm², 8 cm², 9 cm², or 10 cm².

For example, a material of the light guide plate 11 can be plastic.

For example, the light source 12 can be a light emitting diode (LED) lamp. In some embodiments, the light source 12 is composed of a plurality of LED lamps.

With reference to FIG. 1, the light source module 10 can include a frame 14, and the frame 14 and perform a function of securing the light source 12.

With reference to FIGS. 1 and 2, in some embodiments, from the light incident side 111 to the light exiting side 112, an area of each of the micro structures 115 disposed on the light guide surface 117 is the same; and from the light incident side 111 to the light exiting side 112, a number of the micro structures 115 disposed on each unit area of the light guide surface 117 gradually increases. It can be understood that the areas of the micro structures 115 are uniform, but under a condition of a distribution density of the micro structures 115 gradually increasing, a sum of the areas of the micro structures 115 disposed on the unit area on the light guide surface 117 gradually increases.

Figure 3:
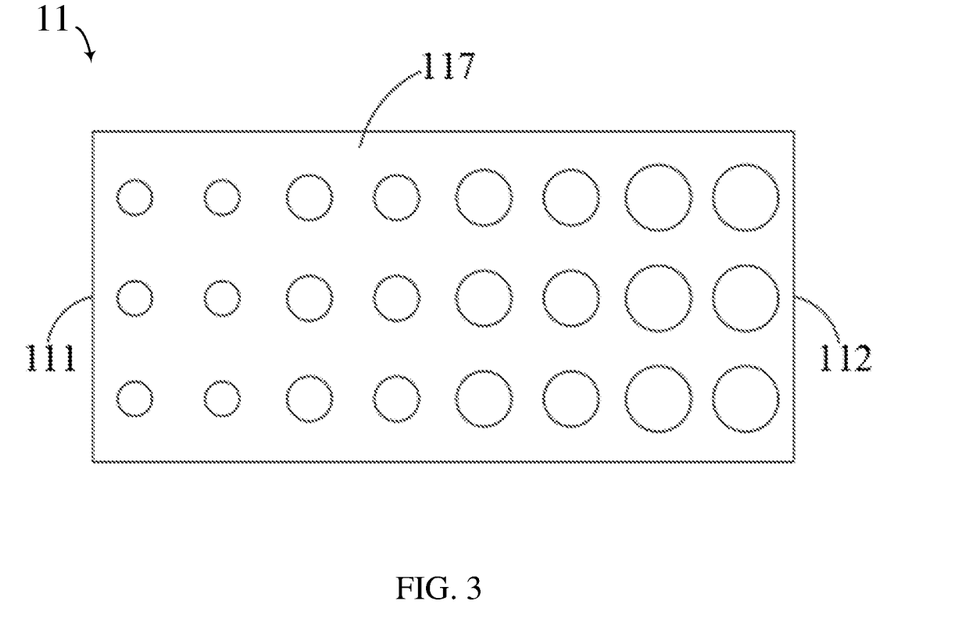
FIG. 3 is a second schematic top view of the light guide plate provided by the embodiment of the present application.

With reference to FIG. 3, from the light incident side 111 to the light exiting side 112, a number of the micro structures 115 disposed on the unit area on the light guide surface 117 is the same; and from the light incident side 111 to the light exiting side 112, the area of each of the micro structures 115 disposed on the light guide surface 117 gradually increases. It can be understood that the distribution density of the micro structures 115 is uniform, but under a condition of the areas of the micro structures 115 gradually increasing, the sum of the areas of the micro structures 115 disposed on the unit area on the light guide surface 117 gradually increases.

Figure 4:
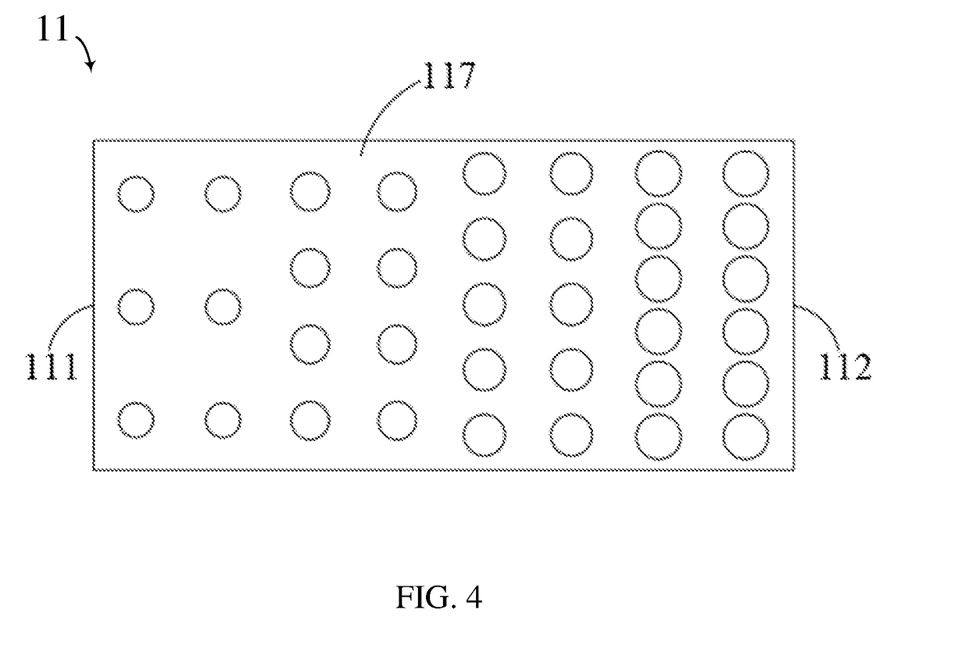
FIG. 4 is a third schematic top view the light guide plate provided by the embodiment of the present application.

With reference to FIG. 4, from the light incident side 111 to the light exiting side 112, the number of the micro structures 115 disposed on the unit area on the light guide surface 117 gradually increases; and from the light incident side 111 to the light exiting side 112, the area of each of the micro structures 115 disposed on the light guide surface 117 gradually increases. It can be understood that under a condition of the distribution density of the micro structures 115 gradually increasing and the areas of the micro structures 115 gradually increasing, the sum of the areas of the micro structures 115 disposed on the unit area on the light guide surface 117 gradually increases.

Figure 5:
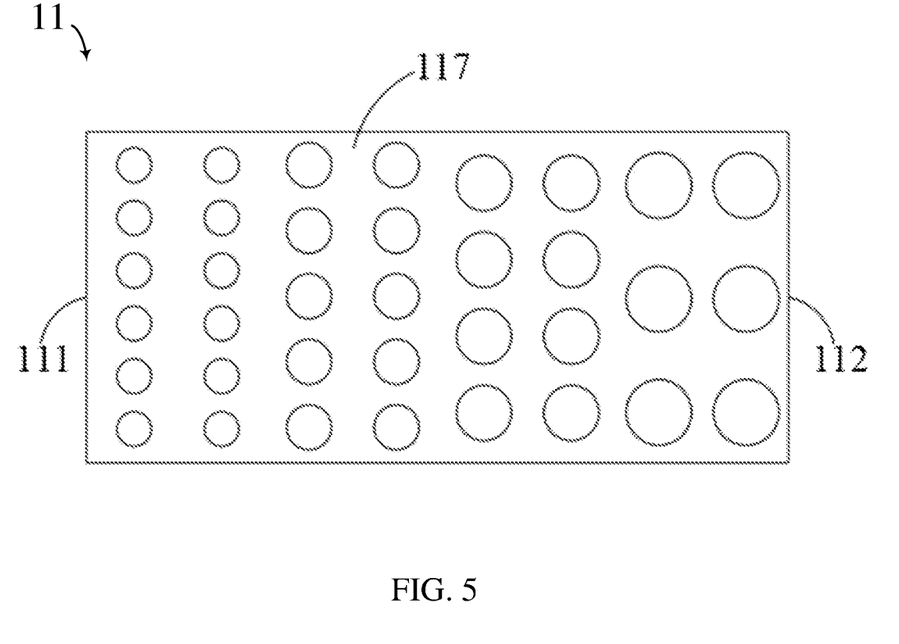
FIG. 5 is a fourth schematic top view of the light guide plate provided by the embodiment of the present application.

With reference to FIG. 5, from the light incident side 111 to the light exiting side 112, the number of the micro structures 115 disposed on the unit area on the light guide surface 117 gradually decreases; and from the light incident side 111 to the light exiting side 112, the area of each of the micro structures 115 disposed on the light guide surface 117 gradually increases. It can be understood that the distribution density of the micro structures 115 gradually decreases, but under a condition of the areas of the micro structures 115 gradually increasing, the sum of the areas of the micro structures 115 disposed on the unit area on the light guide surface 117 can also gradually increase.

Figure 6:
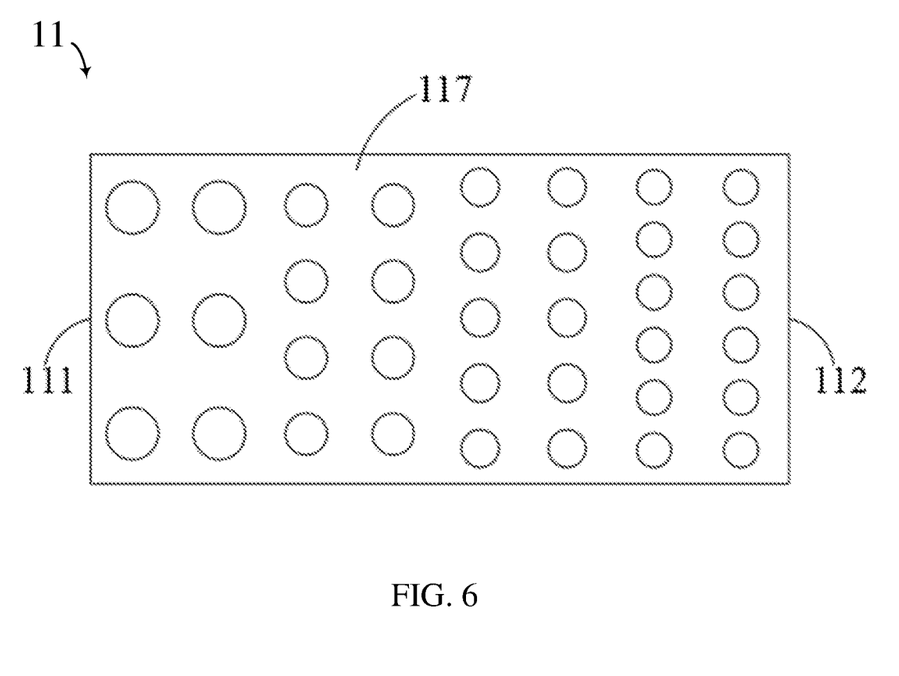
FIG. 6 is a fifth schematic top view the light guide plate provided by the embodiment of the present application.

With reference to FIG. 6, from the light incident side 111 to the light exiting side 112, the number of the micro structures 115 disposed on the unit area on the light guide surface 117 gradually increases; and from the light incident side 111 to the light exiting side 112, the area of each of the micro structures 115 disposed on the light guide surface 117 gradually decreases. It can be understood that the areas of the micro structures 115 gradually decreases, but under a condition of the distribution density of the micro structures 115 gradually increasing, the sum of the areas of the micro structures 115 disposed on the unit area on the light guide surface 117 can also gradually increase.

With reference to FIG. 1, the light source module 10 can include a reflector 13 disposed on a side of the light guide plate 11. It can be understood that the reflector 13 can reflect light emitted out from a side of the light guide plate 11 back to the light guide plate 11 by a mirror surface reflection for repeated use to prevent light loss and improve light use rate such that light exiting brightness of the light guide plate 11 is increased.

For example, the reflectors 13 are disposed on the sides of the light guide plate 11 except for the region of the light incident side 111 to maximally improve light use rate.

In some embodiments, the light guide plate 11 is rectangular, at this time, except for the light incident side 111 in the four sides of the light guide plate 11, the reflectors 13 are disposed on the remaining three sides.

For example, the reflector 13 and the light guide plate 11 can be adhered together through a light transmission adhesive.

For example, a material of the reflector 13 is metal. In some embodiments, the material of the reflector 13 can include at least one of aluminum (Al), silver (Ag), tungsten (W), copper (Cu), nickel (Ni), chromium (Cr), molybdenum (Mo), titanium (Ti), platinum (Pt), tantalum (Ta), and neodymium (Nd).

With reference to FIG. 1, the micro structures 115 can be protrusion structures. For example, protrusion structures can include at least one of curved protrusion and a conic protrusion. For example, the curved protrusion can be hemispherical, and the conic protrusion can be triangular pyramid-shaped, quadrangular pyramid-shaped, pentagonal pyramid-shaped, or hexagonal pyramid-shaped. In some embodiments, the protrusion structures can be formed by an inkjet printing process printing light transmission an ink material.

In some other embodiments, the micro structures 115 can be recess structures, the recess structures can include at least one of curved recesses and conic recesses. For example, the curved recesses can be hemispherical, and the conic recesses can be triangular pyramid-shaped, quadrangular pyramid-shaped, pentagonal pyramid-shaped, or hexagonal pyramid-shaped. In some embodiments. The recess structures can be formed by a laser process.

Figure 7:
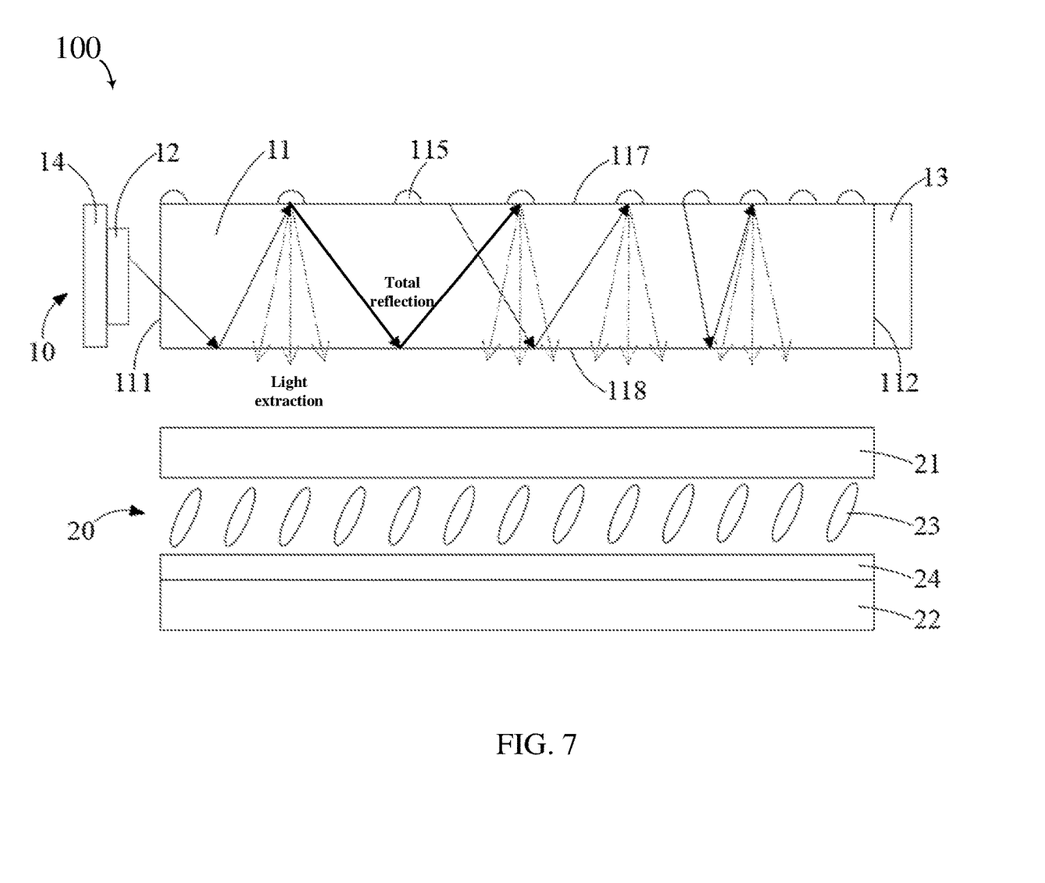
FIG. 7 is a schematic cross-sectional view of a liquid crystal display device provided by the embodiment of the present application.

With reference to FIG. 7, FIG. 7 is a schematic cross-sectional view of a liquid crystal display device provided by the embodiment of the present application. The embodiment of the present application provides a liquid crystal display device 100 including a reflective liquid crystal display panel and a light source module 10 stacked together. The light source module 10 can be the light source module 10 of any one of the above embodiment. The light exiting surface 118 of the light guide plate 11 is disposed toward a display side of the reflective liquid crystal display panel 20.

It should be explained that light emitted out from the light exiting surface 118 of the light guide plate 11 would enter the reflective liquid crystal display panel 20 and provide the reflective liquid crystal display panel with an area light source to enhance display brightness and display effect of the reflective liquid crystal display panel 20. Namely, the liquid crystal display device 100 provided by the embodiment of the present application, by disposing the light source module 10 stacked on the reflective liquid crystal display panel layer, can provide the reflective liquid crystal display panel 20 with an area light source similar to an ambient light to improve a light exiting brightness of the reflective liquid crystal display panel 20. The liquid crystal display device 100 also has a better display effect under a dark environment, and the liquid crystal display device 100 can be used normally even under a condition without the ambient light. Furthermore, because light exiting brightness in each region of the light source module 10 is more even, exiting light uniformity of each region of the liquid crystal display device 100 can be improved.

With reference to FIG. 1, the reflective liquid crystal display panel 20 includes a first substrate 21 and a second substrate 22 disposed oppositely and a liquid crystal layer 23 disposed between the first substrate 21 and the second substrate 22. A side of the first substrate 21 away from the liquid crystal layer 23 is disposed toward the light guide plate 11. A reflective layer 24 is disposed in the second substrate 22. For example, the first substrate 21 can be a color filter (CF) substrate, and the second substrate 22 can be a thin film transistor (TFT) array substrate.

It can be understood that light emitted out from the light guide plate 11, entering the reflective liquid crystal display panel 20 from a side of the first substrate 21 away from the liquid crystal layer 23, would pass through the liquid crystal layer 23 and enter the reflective layer 24. At this time, the reflective layer 24 would reflect incident light. Because the reflected light needs to pass through the liquid crystal layer 23 before emitting out from the reflective liquid crystal display panel 20. Therefore, light transmission rates of different regions of the liquid crystal layer 23 can be adjusted by controlling rotation angles of liquid crystal materials in different regions of the liquid crystal layer 23, to further control light exiting brightness of different regions of the reflective liquid crystal display panel 20.

For example, a material of the reflective layer 24 can be metal. In some embodiments, a material of the reflective layer 24 can include at least one of aluminum (Al), silver (Ag), tungsten (W), copper (Cu), nickel (Ni), chromium (Cr), molybdenum (Mo), titanium (Ti), platinum (Pt), tantalum (Ta), and neodymium (Nd).

In some embodiments, the reflective layer 24 and TFT devices in the second substrate 22 can be formed in the same process. Namely, the material of the reflective layer 24 can be the same as a material of some metal layer (for example, source electrode, drain electrode, and gate electrode) of the TFT device.

The embodiment of the present application further provides a display apparatus, including the liquid crystal display device 100 of any one of the above embodiments.

For example, display apparatus can be an electronic product such as television, advertisement screen, cell phone, tablet, computer display, game apparatus, augmented reality (AR) apparatus, (Virtual Reality, VR) apparatus, or wearable apparatus. The wearable apparatus can be smart bracelet, smart glasses, smart watch, or smart decoration.

The light source module, liquid crystal display device, and display apparatus provided by the embodiment of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A light source module, comprising:
 a light guide plate, comprising a light guide surface and a light exiting surface disposed oppositely, wherein a plurality of micro structures are disposed on a light guide surface of the light guide plate at intervals, a side of the light guide plate disposed toward the light source is defined as a light incident side, a side of the light guide plate disposed away from the light source is defined as a light exiting side, and from the light incident side to the light exiting side, a sum of areas of the micro structures disposed on a unit area of the light guide surface gradually increases; and
 a light source disposed on a side of the light guide plate;
 wherein from the light incident side to the light exiting side, a number of the micro structures disposed on each unit area of the light guide surface gradually increases; and from the light incident side to the light exiting side, an area of each of the micro structures disposed on the light guide surface gradually increases.

2. The light source module according to claim 1, wherein the light source module comprises a reflector disposed on a side of the light guide plate.

3. The light source module according to claim 2, wherein the reflector is disposed on each of sides of the light guide plate except for a region of the light incident side.

4. The light source module according to claim 2, wherein the reflector is adhered to the light guide plate through a light transmission adhesive.

5. The light source module according to claim 1, wherein the micro structures are a protrusion structures or a recess structures.

6. A liquid crystal display device, comprising:
 a reflective liquid crystal display panel; and
 the light source module according to claim 1 stacked on the reflective liquid crystal display panel;
 wherein the light exiting surface of the light guide plate is disposed toward a display side of the reflective liquid crystal display panel.

7. A light source module, comprising:
 a light guide plate, comprising a light guide surface and a light exiting surface disposed oppositely, wherein a plurality of micro structures are disposed on a light guide surface of the light guide plate at intervals, a side of the light guide plate disposed toward the light source is defined as a light incident side, a side of the light guide plate disposed away from the light source is defined as a light exiting side, and from the light incident side to the light exiting side, a sum of areas of the micro structures disposed on a unit area of the light guide surface gradually increases; and
 a light source disposed on a side of the light guide plate;
 wherein from the light incident side to the light exiting side, a number of the micro structures disposed on each unit area of the light guide surface gradually decreases; and from the light incident side to the light exiting side, an area of each of the micro structures disposed on the light guide surface gradually increases.

8. The light source module according to claim 7, wherein the light source module comprises a reflector disposed on a side of the light guide plate.

9. The light source module according to claim 8, wherein the reflector is disposed on each of sides of the light guide plate except for a region of the light incident side.

10. The light source module according to claim 8, wherein the reflector is adhered to the light guide plate through a light transmission adhesive.

11. The light source module according to claim 7, wherein the micro structures are a protrusion structures or a recess structures.

12. A liquid crystal display device, comprising:
a reflective liquid crystal display panel; and
the light source module according to claim 7 stacked on the reflective liquid crystal display panel;
wherein the light exiting surface of the light guide plate is disposed toward a display side of the reflective liquid crystal display panel.

13. A light source module, comprising:
a light guide plate, comprising a light guide surface and a light exiting surface disposed oppositely, wherein a plurality of micro structures are disposed on a light guide surface of the light guide plate at intervals, a side of the light guide plate disposed toward the light source is defined as a light incident side, a side of the light guide plate disposed away from the light source is defined as a light exiting side, and from the light incident side to the light exiting side, a sum of areas of the micro structures disposed on a unit area of the light guide surface gradually increases; and
a light source disposed on a side of the light guide plate;
wherein from the light incident side to the light exiting side, a number of the micro structures disposed on each unit area of the light guide surface gradually increases; and from the light incident side to the light exiting side, an area of each of the micro structures disposed on the light guide surface gradually decreases.

14. The light source module according to claim 13, wherein the light source module comprises a reflector disposed on a side of the light guide plate.

15. The light source module according to claim 14, wherein the reflector is disposed on each of sides of the light guide plate except for a region of the light incident side.

16. The light source module according to claim 14, wherein the reflector is adhered to the light guide plate through a light transmission adhesive.

17. The light source module according to claim 13, wherein the micro structures are a protrusion structures or a recess structures.

18. A liquid crystal display device, comprising:
a reflective liquid crystal display panel; and
the light source module according to claim 13 stacked on the reflective liquid crystal display panel;
wherein the light exiting surface of the light guide plate is disposed toward a display side of the reflective liquid crystal display panel.

* * * * *